United States Patent [19]

Kress

[11] 4,154,537

[45] May 15, 1979

[54] PRODUCT DENSITY CONTROL APPARATUS

[75] Inventor: Kenneth Kress, Shirley, N.Y.

[73] Assignee: Oakes Machine Corporation, Islip, N.Y.

[21] Appl. No.: 827,435

[22] Filed: Aug. 23, 1977

[51] Int. Cl.² .............................................. B01F 15/04
[52] U.S. Cl. ..................................... 366/151; 134/34; 261/64 R; 366/10
[58] Field of Search ..................... 134/34; 261/64 R; 366/151, 160, 142, 162, 3, 10, 13, 101

[56] References Cited

U.S. PATENT DOCUMENTS 3,256,181  6/1966  Zingg ..................................... 366/160
3,591,147  7/1971  Anderson ............................... 366/151

*Primary Examiner*—Robert W. Jenkins
*Attorney, Agent, or Firm*—Brumbaugh, Graves, Donohue & Raymond

[57] ABSTRACT

Apparatus comprising a continuous mixer adapted to receive dry and wet ingredients and a gas to provide a homogeneous output mix, a gamma ray density detector positioned to sense the density of the output mix from the mixer, valve means for controlling the flow of gas into the mixer, and servo means responsive to signals from the detector for automatically controlling the valve means to provide an output mix of substantially uniform density.

8 Claims, 3 Drawing Figures

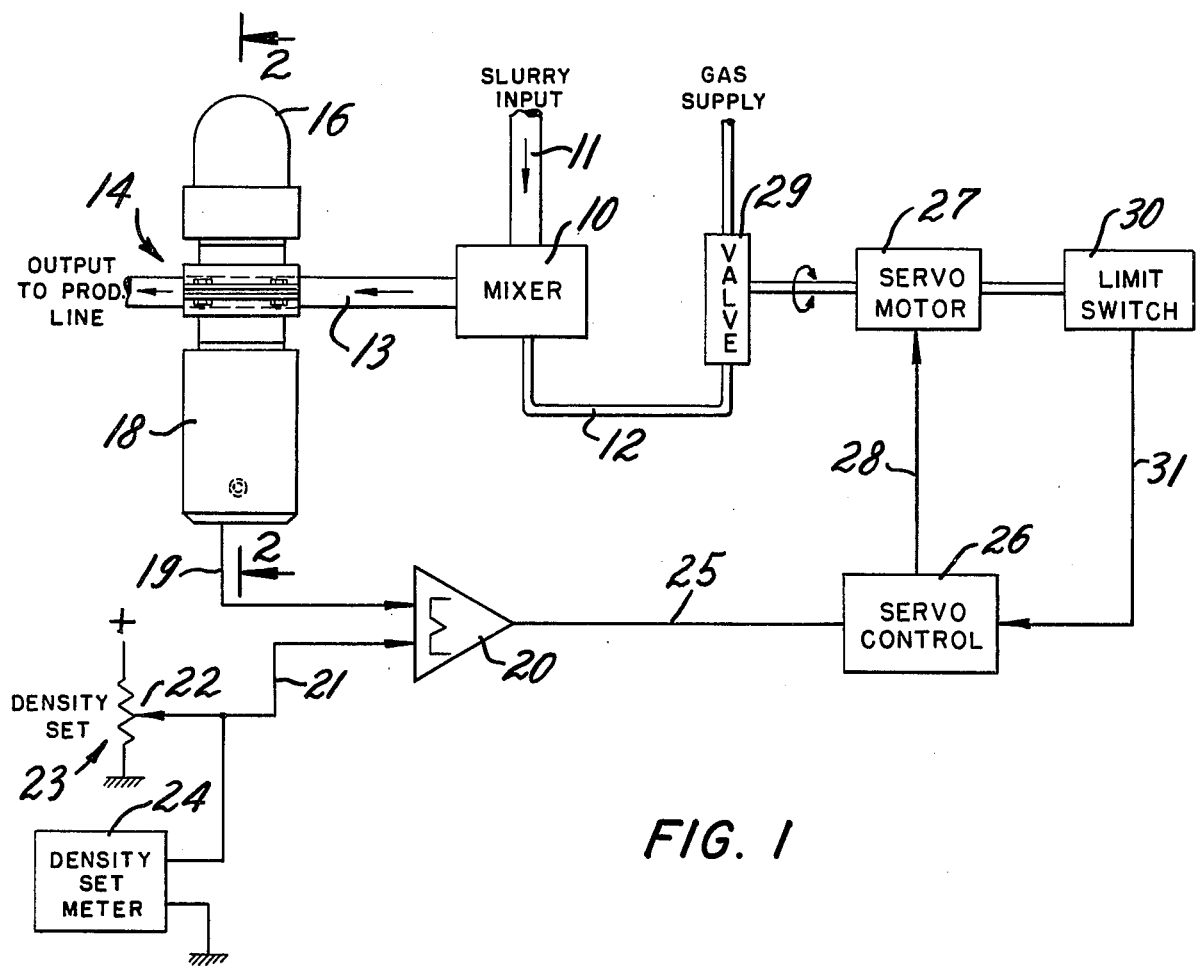
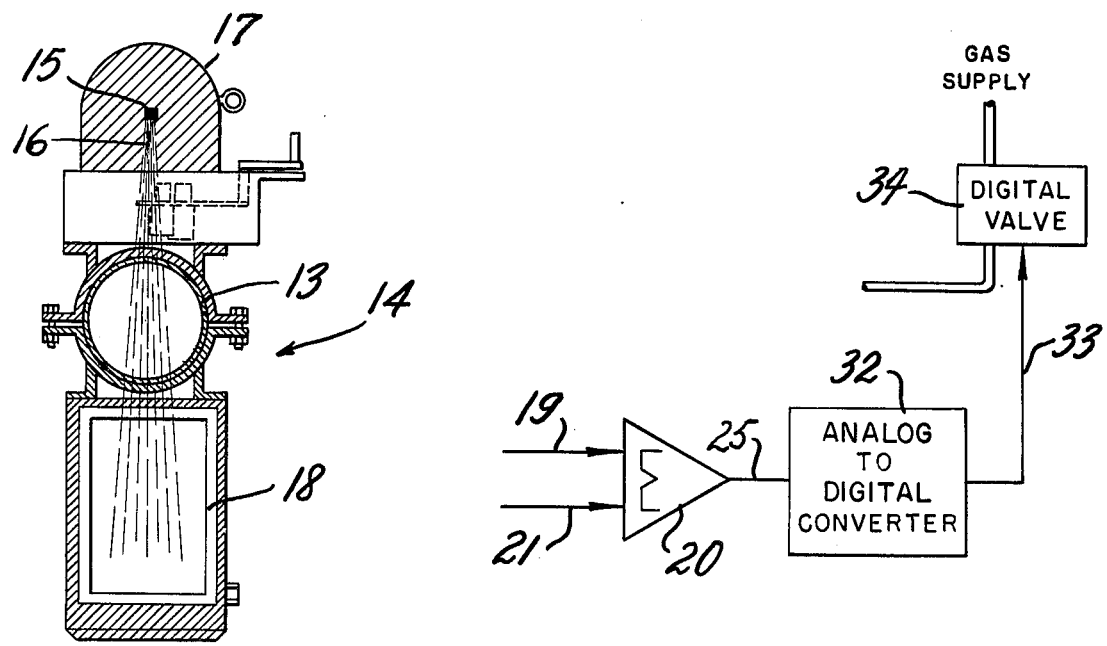
FIG. 1
FIG. 2
FIG. 3

PRODUCT DENSITY CONTROL APPARATUS

BACKGROUND OF THE INVENTION

The present invention relates to apparatus for continuously mixing an aggregation of wet and dry materials and a gas to produce a product of predetermined density. More particularly, it relates to mixing apparatus of this character in which the density of the mixed product is sensed and utilized to control the flow of gas to the apparatus automatically in such fashion as to maintain the density of the mixed product substantially uniform.

In the baking industry, bakery products are produced continuously by premixing certain dry and wet ingredients, and subjecting the premix to vigorous mixing in the presence of a gas, usually air, in a continuous mixer. If a final product of uniform good quality is to be achieved at minimum cost it is essential that the density of the product mix be maintained substantially constant at all times. This requires that the bakery operator take samples of the mix from time to time, weigh them to ascertain the density of the mix, and manually adjust the amount of air introduced into the mix as required to maintain the product density constant. Because of the inconvenience that this entails, it is often the practice to adjust the air supply and other ingredients to achieve the desired product density only at the beginning of a run, and to assume that the product density does not change materially during the run. Actually, the product density does vary so that either the quality of the final product or its cost of production may be adversely affected.

It is an object of the invention, accordingly, to provide new and improved mixing apparatus which is capable of continuosly producing a product mix of substantially uniform density.

Another object of the invention is to provide new and improved mixing apparatus of the above character in which the density of the product mix is continuously sensed and gas is introduced into the mix in response to deviation of the sensed density values from a reference value as required to maintain the density substantially constant.

SUMMARY OF THE INVENTION

According to the invention, a plurality of pre-mixed wet and dry ingredients and a gas, usually air, are continuously fed to mixer apparatus where they are vigorously mixed to produce a substantially homogeneous stream of mixed product. Radiation such as gamma radiation is passed through the product stream to a radiation detector which produces an electrical signal that is a function of the density of the mixed product. The electrical sighal is compared with a reference signal representative of a predetermined density of the mixed product to produce a difference signal representative of any deviation from the desired density. The difference signal is used to adjust the amount of gas introduced into the mixer so as to restore the product density to the reference value and the difference signal substantially to zero. In this way, the density of the product mix is maintained substantially at a reference value during a run.

DESCRIPTION OF A PREFERRED EMBODIMENT

The invention may be better understood from the following detailed description of a preferred embodiment, taken in conjunction with the accompanying drawing, in which:

FIG. 1 illustrates schematically mixing apparatus constructed according to the invention;

FIG. 2 is a view in section taken along the line 2—2 of FIG. 1, looking in the direction of the arrows; and FIG. 3 is a partial view of a modification of the apparatus of FIG. 1 in which a digital valve is used.

Referring to FIGS. 1 and 2, a conventional mixer 10, which may be of the kind shown in U.S. Pat. No. 3,081,069, for example, is continuously supplied with a premix of baking ingredients (e.g. milk, water, liquid fat, flour, etc.,) through a pipe 11 and with a gas, usually air, through a pipe 12. The dough or batter resulting from the mixing operation is discharged from the mixer 10 through a pipe 13 to other apparatus for mass producing a bakery product in the known manner. The density of the dough or batter in the pipe 13 is continuously monitored by known densitometer apparatus 14 clamped to the pipe 13 and comprising a radiation source 15 in a well 16 in leading shielding 17. Radiation from the source 15 is directed through the pipe 13 to a radiation detector 18 which generates an electric signal that is a function of the density of the material flowing through the pipe 13.

The signal from the detector 18 is fed through conductors 19 to a summing amplifier 20 which also receives a reference signal input over a conductor 21. The conductor 21 is connected to the adjustable contact 22 of a potentiometer 23 energized by a fixed source of voltage as shown. A meter 24 enables the value of the reference voltage to be read so that the latter can be set at a predetermined value. The amplifier 20 provides an output which is a function of the difference between the reference signal and the signal from the radiation detector 18. Thus, the output is zero when the signals are equal, is of one polarity when the signal from the detector 18 exceeds the reference signal, and is of the opposite polarity when the reference signal exceeds the signal from the detector 18.

The output signal from the amplifier 20 is fed through a conductor 25 to a servo control 26 that supplies power to a conventional servo motor 27 through conductors 28 to open or close a valve 29 in the gas supply pipe 12 and adjust the flow of gas supplied to the mixer 10. The motor 27 may be provided with upper and lower limit switches 33 connected to the servo control 26 by conductors 31 so as to disable the motor when the valve 29 reaches its upper or lower limit of travel.

Initially, the radiation detector 18 is calibrated in situ by a comparison of its readings with actual density values determined by tests on samples of the material flowing through the pipe 13 and the dial of the meter 24 is scaled in terms of density.

In operation, known and substantially constant proportions of ingredients and gas are continuously fed to the mixer 10 and the adjustable contact 22 of the potentiometer is set at the position corresponding to the density that the product mix in the pipe 13 should have. If, for any reason, the density of the material flowing through the pipe 13 increases, the summation amplifier 20 will receive a difference signal and cause the servo control 26 to operate the motor 27 to increase the flow of gas to the mixer. This will reduce the density of the material flowing in the pipe 13 until the difference signal input to the amplifier 20 is zero, at which time the servo motor 27 will be brought to rest and the valve 29 will remain fixed at the position corresponding to the new flow rate.

Similarly, if the density of the material flowing through the pipe 13 were to decrease, the system will act immediately to drive the motor 27 in the direction to close the valve 29 and reduce the gas flow to the mixer 10 until the density of the output mix is again restored to the present value.

In the modification shown in FIG. 3, a conventional digital valve 34 is used to control the flow of gas to the mixer 10. The output of the summing amplifier 20 is supplied over the conductor 25 to an analog to digital converter 32 which supplies digital signals over conductors 33 to the digital valve 34 to control the same. Operation of the apparatus is otherwise essentially as described above.

The invention thus provides novel and highly effective means for sensing the density of the output mix of a mixing apparatus and automatically controlling the flow of gas thereto so as to maintain an output mix of substantially uniform density.

It will be understood that the invention is not limited to use in bakery apparatus. On the contrary, it is of utility in any application in which a plurality of ingredients and a gas are mixed to provide a continuous flow of a homogeneous product and it is desired to maintain the density of the product uniform.

The invention is not limited to the specific illustrative embodiments described herein but is obviously susceptible of modification in form and detail within the scope of the following claims:

I claim:

1. In mixer apparatus, the combination of a mixer having a gas inlet port, an ingredient inlet port and a mix outlet port, valve means for controlling the supply of gas to said gas inlet port, conduit means connected to receive the mix form from said outlet port, radiation sensitive densitometer means disposed to monitor the density of the mix flowing through said conduit means, and means responsive to said densitometer means for controlling said valve means to control the density of the mix flowing through said conduit means by varying the amount of gas mixed therewith.

2. Mixer apparatus as defined in claim 1 in which the densitometer means provides a signal output representative of the density of the mix flowing through said conduit means, adjustable means is provided for generating a reference signal representative of a mix density to be maintained, and summing amplifier means responsive to the reference signal and the signal output from said densitometer provides an output signal representative of the deviation of the actual mix density from a reference value to control said valve means.

3. Apparatus as defined in claim 2 in which a servo motor drives the valve means, and servo means responsive to said output signal energizes the servo motor means to adjust the flow of gas to the mixer so as to maintain the density of the mix substantially uniform.

4. Mixer apparatus as defined in claim 3 with limit switch means for disabling said servo motor means when the valve means is fully opened or fully closed.

5. Mixer apparatus as defined in claim 2 in which the valve means is digital valve means and an analog to digital converter is interposed between the summing amplifier means and the digital valve means for actuating the latter is response to the output signal from the summing amplifier means to adjust the flow of gas to the mixer so as to maintain the density of the mix substantially constant.

6. A method for controlling the density of a liquid product comprising the steps of continuously feeding the product to a mixing zone, continuously feeding a gas into the mixing zone, intimately mixing said liquid product with the gas in said mixing zone, discharging said intimately mixed gas and liquid product through a conduit, subjecting said mixed product in said conduit to radiation, sensing a characteristic of said radiation representative of the density of said mixed product, and controlling the gas fed into said mixing zone in response to said sensed characteristic to control the density of said mixed product by varying the amount of gas mixed therewith.

7. A method for controlling the density of a liquid product as defined in claim 6 in which the sensed radiation characteristic is compared with a reference value representative of a mix density to be maintained to provide an output signal representative of the deviation of the actual mix density from the density to be maintained, and the gas introduced into said mixing zone is controlled in response to said output signal.

8. A method for controlling the density of a liquid product as defined in claim 7 in which the liquid product comprises a plurality of premixed ingredients that are vigorously mixed with the gas in the mixing zone and are discharged through the conduit in the form of a substantially homegeneous stream, gamma radiation is passed through the product stream to a radiation detector which produces a signal that is a function of the density of the mixed product, the signal from the radiation detector is compared with the reference value to provide a difference signal, and the gas supplied to the mixing zone is controlled in response to said difference signal so as to maintain the density of the product mix substantially at a reference value.

* * * * *